US012603083B2

(12) United States Patent
Kamei et al.

(10) Patent No.: US 12,603,083 B2
(45) Date of Patent: Apr. 14, 2026

(54) ESTIMATION DEVICE, ESTIMATION METHOD, AND RECORDING MEDIUM

(71) Applicant: Panasonic Intellectual Property Management Co., Ltd., Osaka (JP)

(72) Inventors: Hiroki Kamei, Osaka (JP); Yoshihiro Matsumura, Osaka (JP); Masashi Ishimaru, Osaka (JP); Yaming Zhang, Hyogo (JP); Jakusei Kiyosaki, Hyogo (JP); Junko Nakajima, Osaka (JP); Makoto Kariyasu, Miyazaki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 136 days.

(21) Appl. No.: 18/701,536

(22) PCT Filed: Sep. 2, 2022

(86) PCT No.: PCT/JP2022/033134
§ 371 (c)(1),
(2) Date: Apr. 15, 2024

(87) PCT Pub. No.: WO2023/074119
PCT Pub. Date: May 4, 2023

(65) Prior Publication Data
US 2025/0006179 A1    Jan. 2, 2025

(30) Foreign Application Priority Data
Oct. 27, 2021    (JP) ................................. 2021-175958

(51) Int. Cl.
*G10L 15/22* (2006.01)
*G10L 15/02* (2006.01)

(52) U.S. Cl.
CPC .............. *G10L 15/02* (2013.01); *G10L 15/22* (2013.01); *G10L 2015/027* (2013.01); *G10L 2015/221* (2013.01); *G10L 2015/225* (2013.01)

(58) Field of Classification Search
CPC .............. G10L 2015/027; G10L 15/02; G10L 2015/221; G10L 2015/225; G10L 15/22;
(Continued)

(56) References Cited

U.S. PATENT DOCUMENTS

2013/0158434 A1* 6/2013 Shen ...................... A61B 5/746
600/586
2020/0229752 A1 7/2020 Sumi et al.
(Continued)

FOREIGN PATENT DOCUMENTS

JP      2008-289737 A   12/2008
JP          4876207 B2    2/2012
(Continued)

OTHER PUBLICATIONS

International Search Report (ISR) issued on Oct. 11, 2022 in International (PCT) Application No. PCTJP2022/033134.

*Primary Examiner* — Huyen X Vo
(74) *Attorney, Agent, or Firm* — Rimon P.C.

(57)    ABSTRACT

An estimation device includes: an instructor that instructs a speaker to repetitively utter two syllables containing (i) a sound including a velar plosive in a consonant or a sound including an alveolar fricative in a consonant, and (ii) a sound including an alveolar plosive in a consonant; a voice obtainer that obtains a voice of the speaker; an estimator that analyzes a voice feature of the voice obtained, and estimates an oral function of the speaker based on the voice feature analyzed; and a presenter that presents a condition of the oral function of the speaker which has been estimated.

8 Claims, 10 Drawing Sheets

(58) Field of Classification Search
CPC ..... G10L 25/51; A61B 5/6898; A61B 5/7246;
A61B 5/00; A61B 5/7267; A61B 5/4542;
A61B 5/4803; G09B 5/04; G09B 19/04
See application file for complete search history.

(56)                    References Cited

U.S. PATENT DOCUMENTS

| | | |
|---|---|---|
| 2020/0261014 A1 | 8/2020 | Sumi et al. |
| 2020/0365275 A1 | 11/2020 | Barnett et al. |
| 2021/0177340 A1 | 6/2021 | Sumi et al. |
| 2022/0028416 A1* | 1/2022 | Cohen ..................... G10L 25/66 |
| 2022/0293239 A1* | 9/2022 | Nakajima ............ A61B 5/4803 |
| 2023/0113656 A1 | 4/2023 | Omiya |

FOREIGN PATENT DOCUMENTS

| | | |
|---|---|---|
| JP | 6268628 B1 | 1/2018 |
| JP | 2018-015139 A | 2/2018 |
| JP | 6312014 B1 | 4/2018 |
| JP | 6337362 B1 | 6/2018 |
| JP | 2021-500209 A | 1/2021 |
| WO | 2019/081915 A1 | 5/2019 |
| WO | 2019/225242 A1 | 11/2019 |
| WO | 2021/132289 A1 | 7/2021 |

* cited by examiner

FIG. 4

| | Bilabial | Labiodental | Dental | Alveolar | Postalveolar | Retroflex | Palatal | Velar | Uvular | Pharyngeal | Glottal |
|---|---|---|---|---|---|---|---|---|---|---|---|
| Plosive | p b | | | t d | | ʈ ɖ | c ɟ | k ɡ | q ɢ | | ʔ |
| Nasal | m | ɱ | | n | | ɳ | ɲ | ŋ | ɴ | | |
| Trill | ʙ | | | r | | | | | ʀ | | |
| Tap or Flap | | | | ɾ | | ɽ | | | | | |
| Fricative | ɸ β | f v | θ ð | s z | ʃ ʒ | ʂ ʐ | ç ʝ | x ɣ | χ ʁ | ħ ʕ | h ɦ |
| Lateral fricative | | | | ɬ ɮ | | | | | | | |
| Approximant | | ʋ | | ɹ | | ɻ | j | ɰ | | | |
| Lateral approximant | | | | l | | ɭ | ʎ | ʟ | | | |

100

Please repetitively utter
"kata" at a pace at which
"kata" is uttered twice in
one second.

ESTIMATION DEVICE, ESTIMATION METHOD, AND RECORDING MEDIUM

CROSS-REFERENCE TO RELATED APPLICATIONS

This application is the U.S. National Phase under 35 U.S.C. § 371 of International Application No. PCT/JP2022/033134, filed on Sep. 2, 2022, which claims the benefit of foreign priority to Japanese Patent Application No. 2021-175958 filed on Oct. 27, 2021, the entire contents of each of which are hereby incorporated by reference.

TECHNICAL FIELD

The present invention relates to an estimation device, an estimation method, and a recording medium that estimate the oral function of a speaker.

BACKGROUND ART

It is known that a defect in speaking is induced along with a decline in an oral function, such as a sensation felt inside the mouth, chewing, swallowing, and the secretion of saliva. Patent Literature (PTL) 1 through PTL 3 disclose techniques for estimating an oral function using a voice feature obtained from utterance data. With this, the oral function can be estimated.

CITATION LIST

Patent Literature

[PTL 1] Japanese Patent No. 6268628
[PTL 2] Japanese Patent No. 6312014
[PTL 3] Japanese Patent No. 6337362

SUMMARY OF INVENTION

Technical Problem

However, the techniques disclosed by PTL 1 through PTL 3 perform estimation processes based on a particular language (e.g., Japanese). For example, when estimating the oral function of a person who speaks a language different from the above-mentioned particular language, the estimation is performed by causing the person to utter a sentence that can be similarly pronounced as the above-mentioned particular language. However, although the pronunciation is similar, the difference in the voice feature arises from language differences, and this may result in a reduction in the accuracy of estimating the oral function.

In view of the above, the present invention aims to provide an estimation device, etc., with multilingual functionality.

Solution to Problem

An estimation device according to one aspect of the present invention includes: an instructor that instructs a speaker to repetitively utter two syllables containing (i) a sound including a velar plosive in a consonant or a sound including an alveolar fricative in a consonant, and (ii) a sound including an alveolar plosive in a consonant; a voice obtainer that obtains a voice of the speaker; an estimator that analyzes a voice feature of the voice obtained, and estimates an oral function of the speaker based on the voice feature analyzed; and a presenter that presents a condition of the oral function of the speaker which has been estimated.

In addition, an estimation method according to one aspect of the present invention is an estimation method that is implemented by an estimation device. The estimation method includes: instructing, by an instructor included in the estimation device, a speaker to repetitively utter two syllables containing (i) a sound including a velar plosive in a consonant or a sound including an alveolar fricative in a consonant, and (ii) a sound including an alveolar plosive in a consonant; obtaining, by a voice obtainer included in the estimation device, a voice of the speaker; analyzing, by an estimator included in the estimation device, a voice feature of the voice obtained, and estimating, by the estimator, an oral function of the speaker based on the voice feature analyzed; and presenting, by a presenter included in the estimation device, a condition of the oral function of the speaker.

Moreover, a recording medium according to one aspect of the present invention is a non-transitory computer-readable recording medium for use in a computer. The recording medium has a computer program recorded thereon for causing the computer to execute the above-described estimation method.

Advantageous Effects of Invention

The present invention can provide an oral function estimation device, etc., with multilingual functionality.

BRIEF DESCRIPTION OF DRAWINGS

FIG. 4 is a diagram illustrating consonants in the International Phonetic Alphabet.

DESCRIPTION OF EMBODIMENTS

Hereinafter, embodiments will be described with reference to the drawings. Note that the embodiments below each describe a general or specific example. The numerical values, shapes, materials, elements, the arrangement and connection of the elements, steps, the orders of the steps, etc., described in the following embodiments are mere examples, and therefore are not intended to limit the present invention. Furthermore, among the elements in the embodiments below, those not recited in any one of the independent claims representing the most generic concepts will be described as optional elements.

Note that the drawings are schematic diagrams, and do not necessarily provide strictly accurate illustration. Throughout the drawings, the same numeral is given to substantially the same element, and redundant description is omitted or simplified.

Embodiment

An example of usage of estimation device 100 according to the embodiment will be described.

Figure 1:
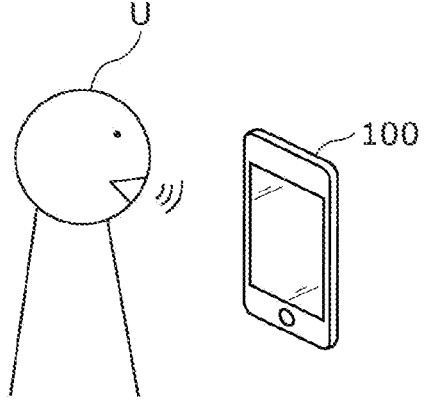
FIG. 1 is a diagram illustrating an example of usage of an estimation device according to an embodiment.

FIG. 1 is a diagram illustrating an example of usage of estimation device 100 according to the embodiment.

Estimation device 100 analyzes the voice of speaker U to estimate an oral function of speaker U.

Estimation device 100 prompts speaker U to utter particular syllables or a fixed sentence to cause speaker U to utter the particular syllables or the fixed sentence, obtains the voice uttered by speaker U, and estimates the oral function of speaker U from the obtained voice (voice data).

Estimation device 100 is, for example, a smartphone or a tablet including a microphone, as illustrated in FIG. 1. Note that estimation device 100 is not limited to a smartphone or a tablet. Instead, estimation device 100 may be a personal computer (PC) or a laptop PC. For example, estimation device 100 need not include a microphone, but instead, estimation device 100 may obtain the voice of speaker U through a separately provided sound collecting device. In addition, estimation device 100 may include an input interface for obtaining personal information of speaker U. The input interface is not particularly limited as long as the input interface is an element having an input function, such as a keyboard, a touch panel, and the like. Moreover, the volume of the microphone may be set by estimation device 100.

Estimation device 100 may include a display to display an image and the like. Note that estimation device 100 need not include a display, but instead, estimation device 100 may cause a separately provided display device to display an image. In addition, estimation device 100 may include a loudspeaker to output sounds. Note that estimation device 100 need not include a loudspeaker, but instead, estimation device 100 may cause a separately provided loudspeaker to output sounds.

In this present embodiment, estimation device 100 is a mobile terminal including a microphone, a display, a loudspeaker, and an input interface. However, as described above, estimation device 100, a sound collecting device, a display device, a loudspeaker, and an input interface may be separately provided. For example, estimation device 100 may be a server device, and may be connected with the sound collecting device, the display device, the loudspeaker, etc. in a wireless manner, for example.

Estimation device 100 obtains the voice of speaker U, analyzes the obtained voice, estimates the oral function of speaker U from a result of the analysis, and presents a condition of the oral function of speaker U. In addition, estimation device 100 may offer a suggestion about the oral function of speaker U. For example, estimation device 100 includes image data for displaying an image showing a condition of the oral function of speaker U or data for offering a suggestion about the oral function of speaker U. With this, estimation device 100 can notify a condition of the oral function of speaker U, a suggestion for preventing a decline in the oral function of speaker U, and the like to speaker U or persons concerned with speaker U (e.g., family). Accordingly, estimation device 100 can prevent a decline in the oral function of speaker U, and can improve the oral function of speaker U.

Estimation device 100 is intended to be used in various countries, and thus has multilingual functionality. Hereinafter, estimation device 100 with multilingual functionality will be described in detail.

Figure 2:
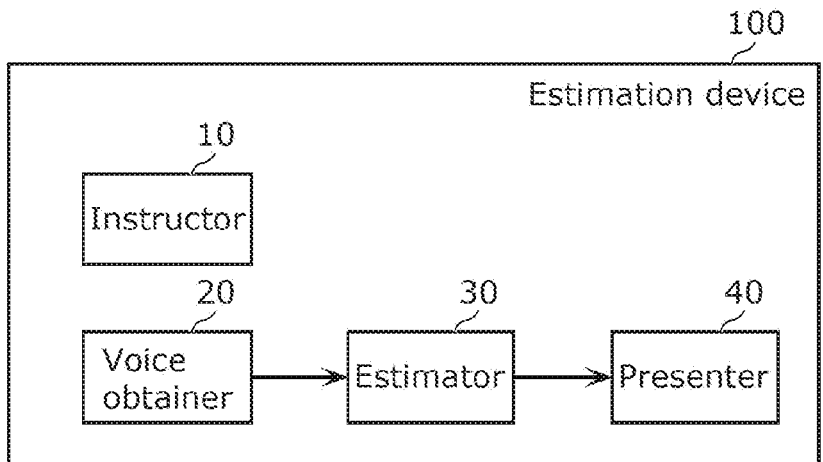
FIG. 2 is a block diagram illustrating a functional configuration of the estimation device according to the embodiment.

FIG. 2 is a block diagram illustrating a functional configuration of estimation device 100 according to the embodiment.

Estimation device 100 includes instructor 10, voice obtainer 20, estimator 30, and presenter 40. Estimation device 100 is a computer including, for example, a processor, a communication interface, and memory. The memory is, for example, read-only memory (ROM), random-access memory (RAM), semiconductor memory, and hard disk drive (HDD), and can store a program to be executed by the processor. Instructor 10, voice obtainer 20, estimator 30, and presenter 40 are implemented by the processor that executes a program stored in the memory, communication interface, etc.

Instructor 10 instructs speaker U to repetitively utter two syllables containing (i) a sound including a velar plosive in a consonant or a sound including an alveolar fricative in a consonant and (ii) a sound including an alveolar plosive in a consonant. Specific examples of these two syllables will be described later. For example, instructor 10 may display, on the display or the like, an image or a video showing an instruction to repetitively utter the two syllables, or may output, from the loudspeaker, a voice instructing to repetitively utter the two syllables. Specific examples of the utterance instruction given by instructor 10 will be described later.

Voice obtainer 20 obtains the voice of speaker U. The voice is the voice of repetitively uttered two syllables containing (i) a sound including a velar plosive in a consonant or a sound including an alveolar fricative in a consonant and (ii) a sound including an alveolar plosive in a consonant.

Note that, although not illustrated, estimation device 100 may obtain the personal information of speaker U. For example, the personal information is information input into estimation device 100 via the input interface, and contains the age, weight, height, sex, body mass index (BMI), dental information (e.g., the number of teeth, the use or unuse of dentures, the position of occlusal support, the number of functioning teeth, the number of remaining teeth, or the like), serum albumin level, eating rate, or the like. Note that the personal information may be obtained using a swallowing screening tool called the Eating Assessment Tool (EAT-10), the Seirei-style swallowing questionnaire, a medical interview, the Barthel index, a basic checklist, or the like.

Estimator 30 analyzes the voice feature of the obtained voice, and estimates the oral function of speaker U based on the analyzed voice feature. A specific example of the estimation processes performed to estimate the oral function will be described later.

Presenter 40 presents a condition of the estimated oral function of speaker U. For example, presenter 40 may display the oral function of speaker U on the display or the like, or may output the oral function of speaker U to a mobile terminal or a PC of speaker U via wireless or wired communication. Note that presenter 40 may check an estimation result of estimating the oral function of speaker U against predetermined data to offer a suggestion about the oral function of speaker U. The predetermined data indicates relationships between estimation results of the oral function and suggestions, and presenter 40 can offer a suggestion according to the estimation result of the oral function. Note that presenter 40 may check obtained personal information against the predetermined data to offer a suggestion suitable for each individual. Presenter 40 may also display the above-described suggestions on the display or the like, or may also output the above-described suggestions to a mobile terminal or a PC of speaker U via wireless or wired communication.

Next, operations performed by estimation device 100 will be described with reference to FIG. 3.

First, instructor 10 instructs speaker U to repetitively utter two syllables containing (i) a sound including a velar plosive in a consonant or a sound including an alveolar fricative in a consonant and (ii) a sound including an alveolar plosive in a consonant (step S11).

The above-described two syllables contain (i) a sound including a velar plosive in a consonant and (ii) a sound including an alveolar plosive in a consonant. More specifically, the above-described two syllables contain (i) a sound including a velar plosive in a consonant and an open vowel in a vowel and (ii) a sound including an alveolar plosive in a consonant and an open vowel in a vowel.

Alternatively, the above-described two syllables contain (i) a sound including an alveolar fricative in a consonant and (ii) a sound including an alveolar plosive in a consonant. More specifically, the above-described two syllables contain (i) a sound including an alveolar fricative in a consonant and an open vowel in a vowel and (ii) a sound including an alveolar plosive in a consonant and an open vowel in a vowel.

Here, velar plosives, alveolar plosives, and alveolar fricatives will be described with reference to FIG. 4, and open vowels will be described with reference to FIG. 5.

FIG. 4 is a diagram illustrating consonants in the International Phonetic Alphabet.

Figure 5:
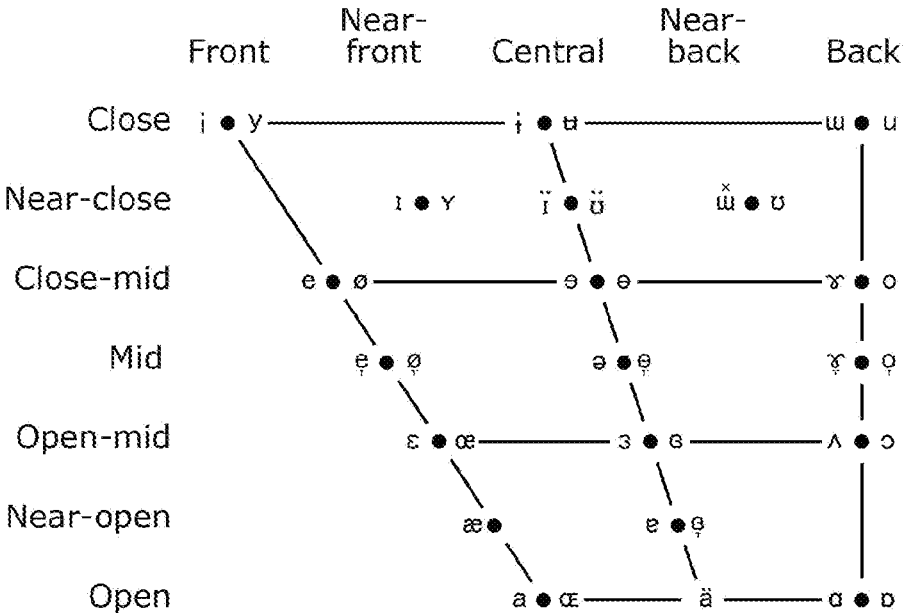
FIG. 5 is a diagram illustrating vowels in the International Phonetic Alphabet.

FIG. 5 is a diagram illustrating vowels in the International Phonetic Alphabet.

As illustrated in FIG. 4, the velar plosives are consonants that are velar and plosive, and are, more specifically, "k" and "g". The alveolar plosives are consonants that are alveolar and plosive, and are, more specifically, "t" and "d". The alveolar fricatives are consonants that are alveolar and fricative, and are, more specifically, "s" and "z".

As illustrated in FIG. 5, the open vowels are front vowels (the open front unrounded vowel and open front rounded vowel), the central vowel (open central unrounded vowel), and back vowels (the open back unrounded vowel and open back rounded vowel), and are, for example, "a" and the like. Note that the open vowels may be the near-open vowels. More specifically, the open vowels may be the near-open front unrounded vowel and the near-open central vowel.

The two syllables containing (i) a sound including a velar plosive in a consonant and an open vowel in a vowel and (ii) a sound including an alveolar plosive in a consonant and an open vowel in a vowel are, for example, "kata". The two syllables containing (i) a sound including an alveolar fricative in a consonant and an open vowel in a vowel and (ii) a sound including an alveolar plosive in a consonant and an open vowel in a vowel are, for example, "sata".

The velar plosives, alveolar plosives, and alveolar fricatives are consonants that exist in many languages of the world. The open vowels are vowels that also exist in many languages of the world. Since estimation device 100 has a function of instructing speaker U to utter two syllables containing the above-described consonants and vowels, estimation device 100 is a device with multilingual functionality.

Since the back of the tongue is used when a velar plosive is uttered and the tip of the tongue is used when an alveolar plosive is uttered, instructor 10 can cause speaker U to repetitively utter two syllables containing a sound including a velar plosive in a consonant and a sound including an alveolar plosive in a consonant to cause the portion of the speaker U's tongue to be used to repetitively move from the back of the tongue to the tip of the tongue. Moreover, since the both sides of the tongue are used when an alveolar fricative is uttered and the center of the tongue is used when an alveolar plosive is uttered, instructor 10 can cause speaker U to repetitively utter two syllables containing a sound including an alveolar fricative in a consonant and a sound including an alveolar plosive in a consonant to cause the portion of the speaker U's tongue to be used to repetitively move from the both sides of the tongue to the center of the tongue.

The two syllables containing (i) a sound including a velar plosive in a consonant and an open vowel in a vowel and (ii) a sound including an alveolar plosive in a consonant and an open vowel in a vowel are not limited to "kata", but may be "gata", "kada", or "gada". Moreover, the two syllables containing (i) a sound including an alveolar fricative in a consonant and an open vowel in a vowel and (ii) a sound including an alveolar plosive in a consonant and an open vowel in a vowel are not limited to "sata", but may be "zata", "sada", or "zada".

Figure 3:
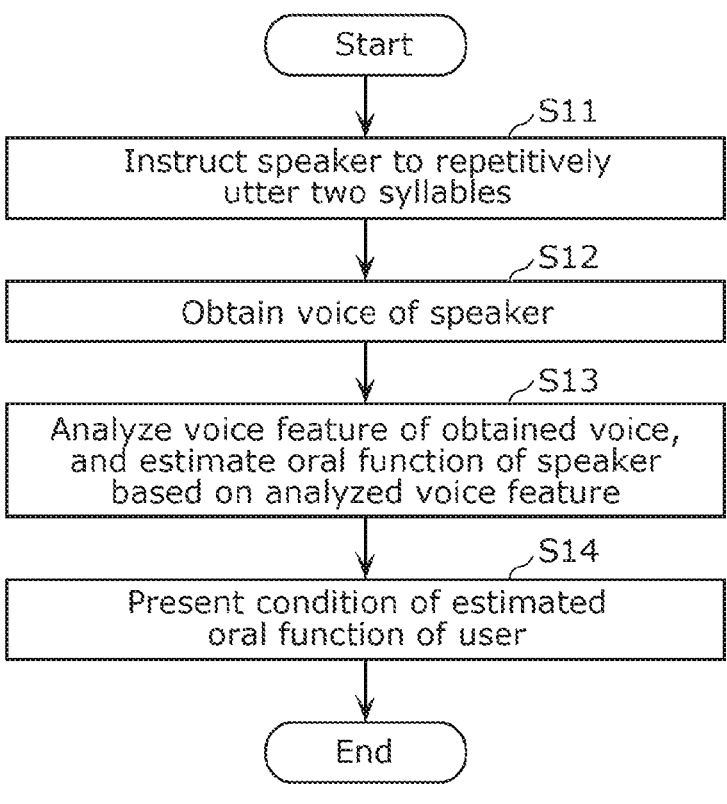
FIG. 3 is a flowchart illustrating operations performed by the estimation device according to the embodiment.

Now, let us go back to the description with reference to FIG. 3. Voice obtainer 20 obtains the voice of speaker U who has repetitively uttered the above-described two syllables (step S12).

Next, estimator 30 analyzes a voice feature of the obtained voice of speaker U, and estimates the oral function of speaker U based on the analyzed voice feature (step S13). The types of the voice feature to be analyzed are various depending on an uttered voice, and include a sound pressure range, a time variation in the sound pressure range, a speech rate, a first formant frequency, a second formant frequency, an amount of change in the first formant frequency, an amount of change in the second formant frequency, a time variation in the first formant frequency, a time variation in the second formant frequency, etc. For example, the voice feature of the voice of speaker U who has uttered the above-described two syllables is, for example, the sound pressure range caused by the movement of the portion of the speaker U's tongue to be used from the back of the tongue to the tip of the tongue or by the movement of the portion of the speaker U's tongue to be used from the both sides of the tongue to the center of the tongue. The repetitive utterances of the above-described two syllables facilitate the analysis of the above-described voice feature.

For example, estimation processes of estimating the oral function based on a voice feature can be performed as indicated below. For example, voice feature quantities of people who have repetitively uttered the above-described two syllables are collected and the oral functions of these people are actually diagnosed. Then, by using correlations between the voice feature quantities of the people and the actual diagnosed results, the oral function of speaker U who has repetitively uttered the above-described two syllables can be estimated from the voice feature of speaker U. For example, machine learning can be used to show correlations between the voice feature quantities and diagnosed results. Logistic regression, a support vector machine (SVM), random forest, etc. can be exemplified as methods of machine learning.

Note that since the speech rate varies depending on a person, the speech rate affects a voice feature when the speed at which two syllables are caused to repetitively uttered is not specified. This may result in inaccuracy of analyzing the voice feature. In view of the above, instructor 10 may instruct speaker U to repetitively utter two syllables at a constant speed in step S11. For example, instructor 10 may instruct speaker U to repetitively utter two syllables at the speed at which the two syllables are uttered twice in one second. Here, examples of an utterance instruction method for giving an utterance instruction will be described with reference to FIG. 6A through FIG. 6F.

FIG. 6A through FIG. 6F each are a diagram illustrating an example of the utterance instruction method.

Figure 6A:
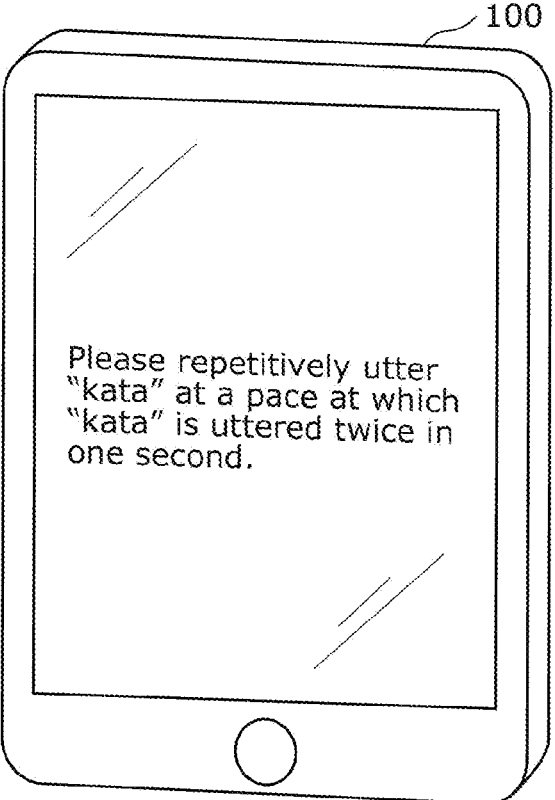
FIG. 6A is a diagram illustrating an example of an utterance instruction method for giving an utterance instruction.

For example, as illustrated in FIG. 6A, an utterance instruction may be displayed on the display or the like of estimation device 100. Here, an example of displaying the utterance instruction "Please repetitively utter "kata" at a pace at which "kata" is uttered twice in one second." is shown. In this way, speaker U can be caused to utter two syllables, such as "kata", twice every one second. Note that the loudspeaker or the like of estimation device 100 may output the above-mentioned instruction.

Figure 6B:
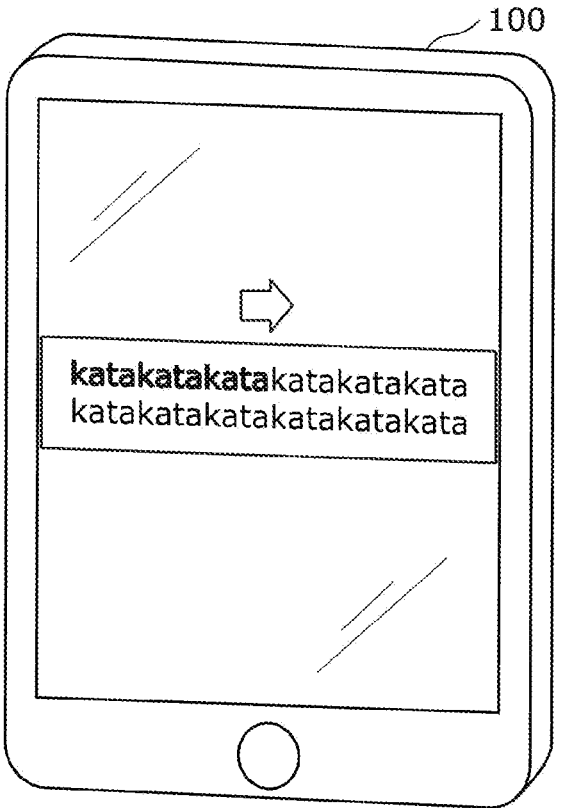
FIG. 6B is a diagram illustrating an example of the utterance instruction method.

For example, as illustrated in FIG. 6B, the display or the like of estimation device 100 may display, for example, "katakatakata . . . " and the color of the characters may change with the passage of time. For example, by changing the color of characters corresponding to two syllables, such as "kata", every 0.5 seconds, speaker U can be caused to utter the two syllables, such as "kata", twice every one second. Note that, together with the above, an utterance instruction as shown in FIG. 6A may be displayed or an utterance instruction (e.g., an instruction like "Please say "kata" in accordance with the caption for five seconds.") may be given by voice.

Figure 6C:
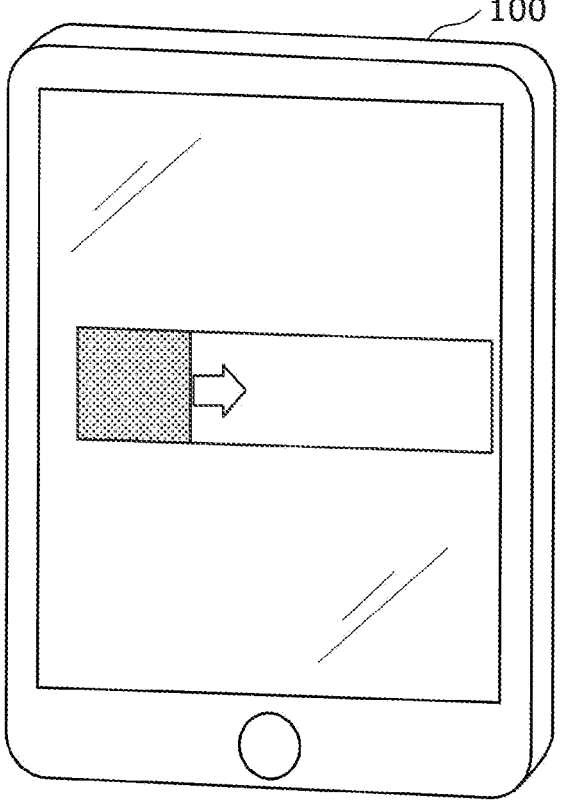
FIG. 6C is a diagram illustrating an example of the utterance instruction method.

For example, as illustrated in FIG. 6C, a progress bar may be displayed on the display or the like of estimation device 100, and the bar may be filled with the passage of time. Note that, together with the above, an utterance instruction as shown in FIG. 6A may be displayed or an utterance instruction (e.g., an instruction like "Please say "kata" in accordance with the movement of the bar for five seconds.") may be given by voice.

Figure 6D:
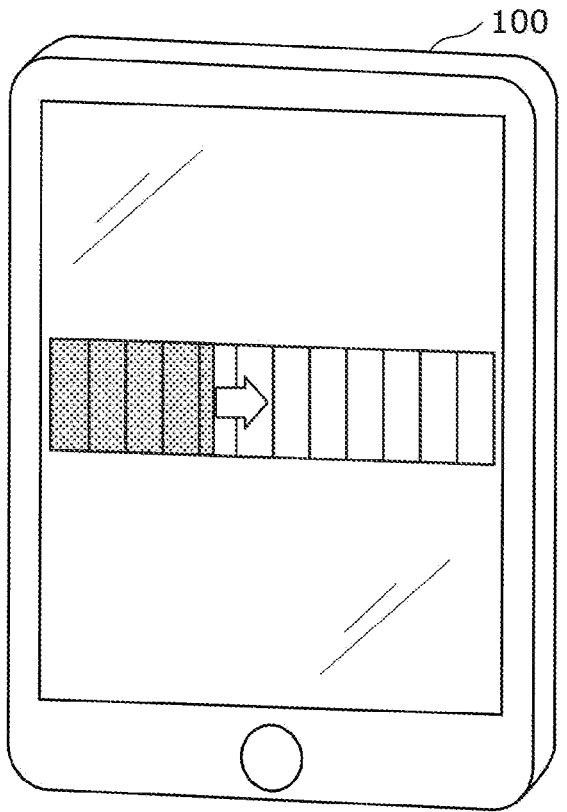
FIG. 6D is a diagram illustrating an example of the utterance instruction method.

For example, as illustrated in FIG. 6D, the progress bar may include a plurality of lines drawn in the bar, and each of intervals between the lines may be, for example, a distance that the bar moves in 0.5 seconds. In this way, speaker U can be caused to utter two syllables, such as "kata", twice every one second. Note that, together with the above, an utterance instruction as shown in FIG. 6A may be displayed or an utterance instruction (e.g., an instruction like "Please say "kata" in accordance with the line for five seconds.") may be given by voice.

Figure 6E:
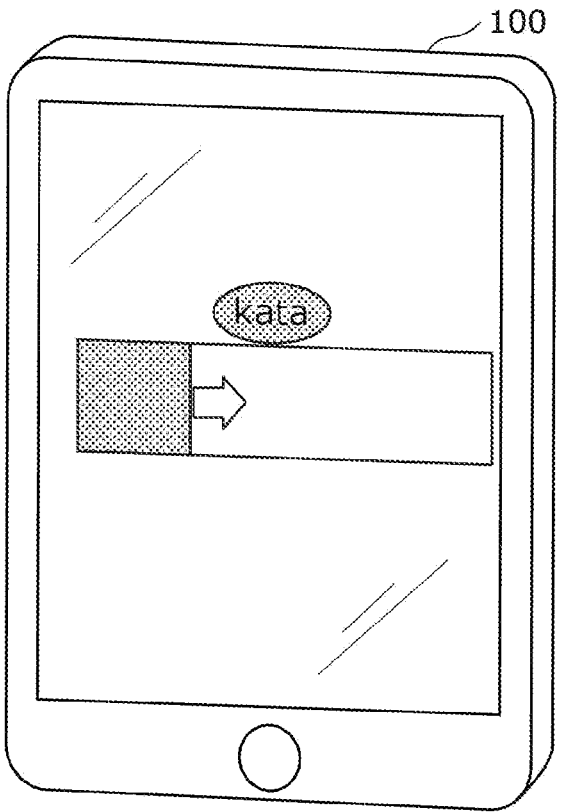
FIG. 6E is a diagram illustrating an example of the utterance instruction method.

For example, as illustrated in FIG. 6E, a progress bar and an image showing "kata" may be displayed on the display or the like of estimation device 100, and the image may flicker every 0.5 seconds. In this way, speaker U can be caused to utter two syllables, such as "kata", twice every one second. Note that, together with the above, an utterance instruction as shown in FIG. 6A may be displayed or an utterance instruction (e.g., an instruction like "Please say "kata" in accordance with the flicker for five seconds.") may be given by voice.

Figure 6F:
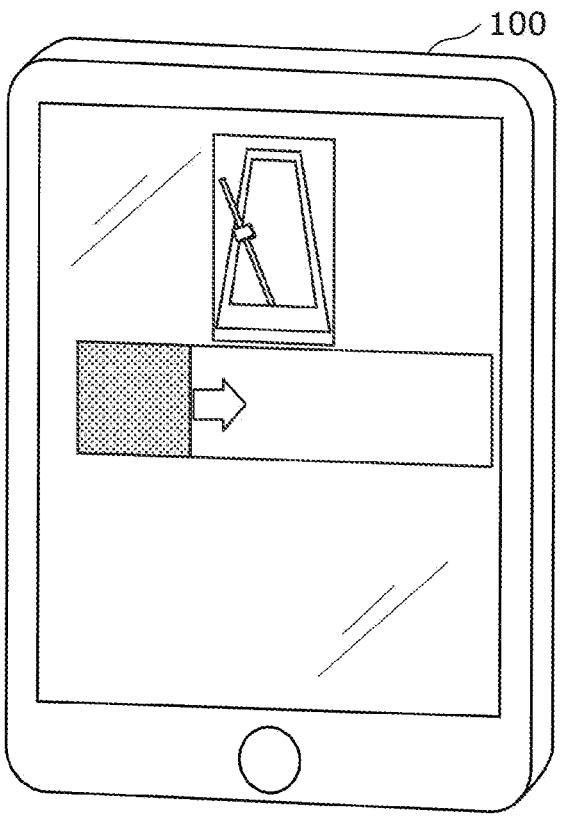
FIG. 6F is a diagram illustrating an example of the utterance instruction method.

For example, as illustrated in FIG. 6F, the progress bar and an animation of, for example, a metronome may be displayed on the display or the like of estimation device 100, and a sound may be output in accordance with the movement of the metronome every 0.5 seconds, for example. In this way, speaker U is caused to utter two syllables, such as "kata", twice every one second. Note that, together with the above, an utterance instruction as shown in FIG. 6A may be displayed or an utterance instruction (e.g., an instruction like "Please say "kata" in accordance with the movement of the metronome for five seconds.") may be given by voice.

As has been described above, repetitive utterances of two syllables at a constant speed facilitate an accurate analysis of the voice feature. Since the speed of twice every one second is particularly the speed that speaker U can utter with ease, it is possible to facilitate even more accurate analysis of the voice feature.

Note that although an example in which the time for which two syllables such as "kata" is caused to repetitively uttered is five seconds is provided here, the time for the utterance is not limited to five seconds. The time may be longer (e.g., 10 seconds) depending on what is caused to be uttered. Moreover, with consideration given to the physical condition and the like of speaker U, an ingenious way, such as shortening of the time, may be sought.

Now, let us go back to the description with reference to FIG. 3. Presenter 40 presents a condition of the estimated oral function of speaker U (step S14). For example, the condition of the oral function of speaker U is displayed on the display or the like of estimation device 100. Note that the condition of the oral function of speaker U may be output, by voice, from the loudspeaker or the like of estimation device 100.

As has been described above, estimation device 100 according to the present embodiment includes: instructor 10 that instructs speaker U to repetitively utter two syllables containing (i) a sound including a velar plosive in a consonant or a sound including an alveolar fricative in a consonant, and (ii) a sound including an alveolar plosive in a consonant; voice obtainer 20 that obtains a voice of speaker U; estimator 30 that analyzes a voice feature of the voice obtained, and estimates an oral function of speaker U based on the voice feature analyzed; and presenter 40 that presents a condition of the oral function of speaker U which has been estimated. For example, the above-described two syllables contain a sound including a velar plosive in a consonant and a sound including an alveolar plosive in a consonant. Alternatively, the above-described two syllables contain a sound including an alveolar fricative in a consonant and a sound including an alveolar plosive in a consonant.

The velar plosives, alveolar fricatives, and alveolar plosives are consonants that exist in many languages of the world. Since estimation device 100 has a function of instructing speaker U to utter two syllables including the above-described consonants, estimation device 100 with multilingual functionality can be provided. Moreover, since the back of the tongue is used when a velar plosive is uttered and the tip of the tongue is used when an alveolar plosive is uttered, causing speaker U to repetitively utter two syllables containing a sound including a velar plosive in a consonant and a sound including an alveolar plosive in a consonant can cause the portion of the speaker U's tongue to be used to repetitively move from the back of the tongue to the tip of the tongue. In addition, since the both sides of the tongue are used when an alveolar fricative is uttered and the center of the tongue is used when an alveolar plosive is uttered, causing speaker U to repetitively utter two syllables containing a sound including an alveolar fricative in a consonant and a sound including an alveolar plosive in a consonant can cause the portion of the speaker U's tongue to be used to repetitively move from the both sides of the tongue to the center of the tongue. Accordingly, the analysis of a voice feature (e.g., sound pressure range) that concerns with these above-described tongue movements is facilitated, and therefore the accuracy of estimating the oral function can be increased.

For example, the above-described two syllables may contain (i) a sound including a velar plosive in a consonant and an open vowel in a vowel and (ii) a sound including an alveolar plosive in a consonant and an open vowel in a vowel. Alternatively, for example, the above-described two syllables may contain (i) a sound including an alveolar fricative in a consonant and an open vowel in a vowel and (ii) a sound including an alveolar plosive in a consonant and an open vowel in a vowel.

The open vowels are vowels that exist in many languages of the world. Since estimation device 100 has a function of instructing speaker U to utter two syllables including the above-described vowels, estimation device 100 with multilingual functionality can be provided.

For example, instructor 10 may instruct speaker U to repetitively utter the above-described two syllables at a constant speed. For example, instructor 10 may instruct speaker U to repetitively utter the above-described two syllables at a speed at which the two syllables are uttered twice in one second.

Since the speech rate varies depending on a person, the speech rate affects a voice feature when the speed at which two syllables are repetitively uttered is not specified. This may result in inaccuracy of analyzing the voice feature. In view of the above, repetitive utterances of two syllables at a constant speed facilitate an accurate analysis of the voice feature. Since the speed of twice every one second is particularly the speed that speaker U can utter with ease, it is possible to facilitate even more accurate analysis of the voice feature.

For example, presenter 40 may check an estimation result of the oral function of speaker U against predetermined data to offer a suggestion about the oral function of speaker U.

In this way, a suggestion regarding a course of action to be taken when the oral function is declined can be offered to speaker U, etc.

Other Embodiments

Hereinbefore, estimation device 100 according to the embodiment has been described, but the present invention is not limited to the above embodiment.

For example, although the above embodiment has provided examples in which two syllables that speaker U are caused to repetitively utter contain (i) a sound including a velar plosive in a consonant and an open vowel in a vowel and a sound including an alveolar plosive in a consonant and an open vowel in a vowel, and (ii) a sound including an alveolar fricative in a consonant and an open vowel in a vowel and a sound including an alveolar plosive in a consonant and an open vowel in a vowel, the two syllables are non-limiting. For example, the above-described two syllables may contain a sound including a vowel other than an open vowel.

For example, although the above embodiment has provided an example in which the instruction is given to speaker U to repetitively utter the above-described two syllables at a constant speed, the instruction about the constant speed need not be given.

Estimation results of the oral function may be accumulated together with personal information as big data to be used for machine learning. Suggestions about the oral function may also be accumulated together with personal information as big data to be used for machine learning.

For example, although the above-described embodiment has provided an example in which a suggestion about the oral function of speaker U is offered, the above-described suggestion need not be offered.

Note that the present invention can be implemented not only as estimation device 100, but also as an estimation method including steps (processes) performed by respective elements included in estimation device 100.

More specifically, the estimation method is an estimation method implemented by an estimation device. As illustrated in FIG. 3, the estimation method includes: an instruction step of instructing, by an instructor included in the estimation device, a speaker to repetitively utter two syllables containing (i) a sound including a velar plosive in a consonant or a sound including an alveolar fricative in a consonant, and (ii) a sound including an alveolar plosive in a consonant (step S11); a voice obtaining step of obtaining, by a voice obtainer included in the estimation device, a voice of the speaker (step S12); an estimation step of analyzing, by an estimator included in the estimation device, a voice feature of the voice obtained, and estimating, by the estimator, an oral function of the speaker based on the voice feature analyzed (step S13); and a presentation step of presenting, by a presenter included in the estimation device, a condition of the oral function of the speaker (step S14).

In addition, for example, these steps included in the estimation method may be executed by a computer (computer system). The present invention can be implemented as a program for causing the computer to execute these steps included in the method.

Furthermore, the present invention can be implemented as a non-transitory computer-readable recording medium, such as a CD-ROM, on which the program is recorded.

For example, when the present invention is implemented by a program (software), each of the steps is performed by execution of a program using hardware resources, such as a central processing unit (CPU), memory, and an input/output circuit. In other words, the CPU obtains data from the memory, the input/output circuit, or the like, arithmetically calculates the data, and outputs a result of the calculation to the memory, the input/output circuit, or the like to execute each step.

Moreover, each element included in estimation device 100 according to the above-described embodiment may be implemented as a dedicated circuit or a general-purpose circuit.

Moreover, each element included in estimation device 100 according to the above-described embodiment may be implemented as a large scale integration (LSI) circuit that is an integrated circuit (IC).

In addition, the IC is not limited to the LSI circuit. The IC may be implemented as a dedicated circuit or a general-purpose processor. A field programmable gate array (FPGA) that can be programmed, or a reconfigurable processor that allows the reconfiguration of the connection and setting of a circuit cell inside the LSI circuit may be used.

Furthermore, when technology for circuit integration that replaces the LSI circuit is developed as a result of advancements of or derivatives from the semiconductor technology, such technology may be used as a matter of course to integrate the circuit of each element included in estimation device 100.

The present invention also encompasses: embodiments achieved by applying various modifications conceivable to those skilled in the art to each of the embodiments; and embodiments achieved by optionally combining the elements and functions of each of the embodiments without departing from the spirit of the present invention.

Supplementary Notes

The following technical aspects are disclosed based on the above-described embodiments.

(Technical Aspect 1) An estimation device comprising: an instructor that instructs a speaker to repetitively utter two syllables containing (i) a sound including a velar plosive in a consonant or a sound including an alveolar fricative in a consonant, and (ii) a sound including an alveolar plosive in a consonant; a voice obtainer that obtains a voice of the speaker; an estimator that analyzes a voice feature of the voice obtained, and estimates an oral function of the speaker based on the voice feature analyzed; and a presenter that presents a condition of the oral function of the speaker which has been estimated.

(Technical Aspect 2) The estimation device according to technical aspect 1, wherein the two syllables contain a sound including a velar plosive in a consonant and a sound including an alveolar plosive in a consonant.

(Technical Aspect 3) The estimation device according to technical aspect 2, wherein the two syllables contain (i) a sound including a velar plosive in a consonant and an open vowel in a vowel and (ii) a sound including an alveolar plosive in a consonant and an open vowel in a vowel.

(Technical Aspect 4) The estimation device according to technical aspect 1, wherein the two syllables contain a sound including an alveolar fricative in a consonant and a sound including an alveolar plosive in a consonant.

(Technical Aspect 5) The estimation device according to technical aspect 4, wherein the two syllables contain (i) a sound including an alveolar fricative in a consonant and an open vowel in a vowel and (ii) a sound including an alveolar plosive in a consonant and an open vowel in a vowel.

(Technical Aspect 6) The estimation device according to any one of technical aspects 1 to 5, wherein the instructor instructs the speaker to repetitively utter the two syllables at a constant speed.

(Technical Aspect 7) The estimation device according to technical aspect 6, wherein the instructor instructs the speaker to repetitively utter the two syllables at a speed at which the two syllables are uttered twice in one second.

(Technical Aspect 8) The estimation device according to any one of technical aspects 1 to 7, wherein the presenter checks an estimation result of the oral function of the speaker against predetermined data to offer a suggestion about the oral function of the speaker.

(Technical Aspect 9) An estimation method that is implemented by an estimation device, the estimation method comprising: instructing, by an instructor included in the estimation device, a speaker to repetitively utter two syllables containing (i) a sound including a velar plosive in a consonant or a sound including an alveolar fricative in a consonant, and (ii) a sound including an alveolar plosive in a consonant; obtaining, by a voice obtainer included in the estimation device, a voice of the speaker; analyzing, by an estimator included in the estimation device, a voice feature of the voice obtained, and estimating, by the estimator, an oral function of the speaker based on the voice feature analyzed; and presenting, by a presenter included in the estimation device, a condition of the oral function of the speaker.

(Technical Aspect 10) A non-transitory computer-readable recording medium for use in a computer, the recording medium having recorded thereon a computer program for causing the computer to execute the estimation method according to technical aspect 9.

The invention claimed is:

1. An estimation device comprising:
a microphone, a display, and a processor configured to perform operations comprising:
instructing a speaker to repetitively utter two syllables containing both of (i) a sound including a velar plosive in a consonant or a sound including an alveolar fricative in a consonant, and (ii) a sound including an alveolar plosive in a consonant;
obtaining, via the microphone, a voice of the speaker;
analyzing a voice feature of the voice obtained, and estimating an oral function of the speaker based on the voice feature analyzed; and
presenting, via the display, a condition of the oral function of the speaker which has been estimated, wherein
the instructing includes instructing the speaker to repetitively utter the two syllables at a speed at which the two syllables are uttered twice in one second.

2. The estimation device according to claim 1, wherein the two syllables contain a sound including a velar plosive in a consonant and a sound including an alveolar plosive in a consonant.

3. The estimation device according to claim 2, wherein the two syllables contain (i) a sound including a velar plosive in a consonant and an open vowel in a vowel and (ii) a sound including an alveolar plosive in a consonant and an open vowel in a vowel.

4. The estimation device according to claim 1, wherein the two syllables contain a sound including an alveolar fricative in a consonant and a sound including an alveolar plosive in a consonant.

5. The estimation device according to claim 4, wherein the two syllables contain (i) a sound including an alveolar fricative in a consonant and an open vowel in a vowel and (ii) a sound including an alveolar plosive in a consonant and an open vowel in a vowel.

6. The estimation device according to claim 1, wherein the presenter checks an estimation result of the oral function of the speaker against predetermined data to offer a suggestion about the oral function of the speaker.

7. An estimation method that is implemented by an estimation device comprising a microphone and a display, the estimation method comprising:
instructing a speaker to repetitively utter two syllables containing both of (i) a sound including a velar plosive in a consonant or a sound including an alveolar fricative in a consonant, and (ii) a sound including an alveolar plosive in a consonant;
obtaining via the microphone, a voice of the speaker;
analyzing a voice feature of the voice obtained, and estimating an oral function of the speaker based on the voice feature analyzed; and
presenting via the display, a condition of the oral function of the speaker, wherein
the instructing includes instructing the speaker to repetitively utter the two syllables at a speed at which the two syllables are uttered twice in one second.

8. A non-transitory computer-readable recording medium for use in a computer, the recording medium having recorded thereon a computer program for causing the computer to execute the estimation method according to claim 7.

* * * * *